United States Patent
Fluga et al.

(10) Patent No.: US 6,536,209 B2
(45) Date of Patent: Mar. 25, 2003

(54) POST INJECTIONS DURING COLD OPERATION

(75) Inventors: Eric C. Fluga, Dunlap, IL (US); Brian G. McGee, Chillicothe, IL (US); Kent A. Koshkarian, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/888,496

(22) Filed: Jun. 26, 2001

(65) Prior Publication Data

US 2002/0194837 A1 Dec. 26, 2002

(51) Int. Cl.$^7$ ................................................. F01N 3/00
(52) U.S. Cl. ............................. 60/284; 60/274; 60/285; 60/286; 60/300
(58) Field of Search .................... 60/274, 284, 286, 60/285, 300; 123/299, 300, 406.47

(56) References Cited

U.S. PATENT DOCUMENTS

| | | | |
|---|---|---|---|
| 4,132,209 A | 1/1979 | Resler, Jr. | |
| 4,452,040 A | 6/1984 | Kobashi | |
| 4,565,065 A | 1/1986 | Kimura et al. | |
| 4,685,290 A | 8/1987 | Kamiya et al. | |
| 5,261,366 A * | 11/1993 | Regueiro | 123/299 |
| 5,479,775 A | 1/1996 | Kraemer et al. | |
| 5,642,705 A | 7/1997 | Morikawa et al. | |
| 5,839,275 A | 11/1998 | Hirota et al. | |
| 5,910,096 A | 6/1999 | Hepburn et al. | |
| 5,947,080 A | 9/1999 | Weissman et al. | |
| 5,950,419 A | 9/1999 | Nishimura et al. | |
| 5,956,942 A | 9/1999 | Sebastiano et al. | |
| 5,975,046 A | 11/1999 | Kaneko et al. | |
| 6,016,653 A | 1/2000 | Glassey et al. | |
| 6,029,623 A | 2/2000 | Weissman et al. | |
| 6,041,591 A | 3/2000 | Kaneko et al. | |
| 6,044,642 A | 4/2000 | Nishimura et al. | |
| 6,067,489 A * | 5/2000 | Letang et al. | 123/299 |
| RE36,737 E * | 6/2000 | Brehob et al. | 60/284 |
| 6,109,024 A * | 8/2000 | Kinugasa et al. | 60/285 |
| 6,173,571 B1 * | 1/2001 | Kaneko et al. | 60/286 |
| 6,293,095 B1 * | 9/2001 | Yamamoto et al. | 60/274 |
| 6,311,484 B1 * | 11/2001 | Roth et al. | 60/286 |
| 6,318,074 B1 * | 11/2001 | Nishimura et al. | 60/284 |
| 6,345,500 B2 * | 2/2002 | Itou et al. | 60/284 |
| 6,354,269 B1 * | 3/2002 | Saito et al. | 123/436 |

FOREIGN PATENT DOCUMENTS

EP 1 096 126 A2 5/2001

* cited by examiner

Primary Examiner—Thomas Denion
Assistant Examiner—Diem T Tran

(57) ABSTRACT

An exhaust gas heating system and method of a direct injection compression ignition internal combustion engine which has a plurality of combustion chambers, an exhaust passage, and one or more direct fuel injection devices, each operable to inject fuel directly into a corresponding one of the combustion chambers. The system also includes a fuel injection controller which is operable to provide to at least one of the direct fuel injection devices, a post fuel injection signal during a corresponding cylinder cycle of the corresponding one of the plurality of combustion chambers. The post fuel injection signal is timed so as to provide exhaust gas heating from a resultant post fuel injection, and the fuel injection controller dynamically determines the particular one or more of the plurality of direct fuel injection devices to which the post fuel injection signal will be applied based on a temperature related engine operating parameter such as a desired amount of exhaust gas heating. The post fuel injection may also be timed and/or shaped such that it does not produce a substantial amount of mechanical energy but instead produces heated exhaust gasses.

17 Claims, 5 Drawing Sheets

POST INJECTIONS DURING COLD OPERATION

TECHNICAL FIELD

This invention relates generally to electronically controlled fuel injection systems and, more particularly, to a method and apparatus for delivering multiple fuel injections to the cylinder of an internal combustion engine during a fuel injection event including a post fuel injection, based upon engine operating conditions.

BACKGROUND

Electronically controlled direct fuel injection devices such as electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an electronic fuel injection signal received from an electronic fuel injection control device (controller). These signals include waveforms that are indicative of a desired injection rate as well as the desired timing and quantity of fuel to be injected into the cylinders.

Emission regulations pertaining to engine exhaust emissions are becoming consistently more restrictive throughout the world including, for example, restrictions on the emission of hydrocarbons (HC), carbon monoxide, the release of particulates, and the release of nitrogen oxides (NOx). Tailoring the number of injections and the injection rate of fuel to a combustion chamber, as well as the quantity and timing of such fuel injections, is one way in which to control emissions and meet such emission standards. As a result, split or multiple fuel injection techniques have been utilized to modify the burn characteristics of the combustion process in an attempt to reduce emission and noise levels. Split injection typically involves splitting the total fuel delivery to the cylinder during a particular injection event into at least two separate fuel injections such as a pilot injection and a primary fuel injection which might further include a main injection and an anchor injection.

As part of an emissions control strategy it has been found to be beneficial to inject a "shot" of fuel into a fuel cylinder later in the exhaust stroke. Such a later "shot" is referred to as a "post shot," or "post injection." The post shot is injected to provide unburned hydrocarbons to a NOx catalyst for higher NOx conversion efficiency.

To additionally effectively reduce NOx emissions it is known in the art to include an exhaust treatment device including a NOx catalyst in an exhaust system of an internal combustion engine. In a lean burning direct injected compression ignition engine a variety of NOx catalysts may be used. However, the current technology of NOx catalysts requires a sufficient concentration of a reducing agent, usually a hydrocarbon (HC) compound, to be present in the exhaust gas at the catalyst. Therefore, the reducing agent or hydrocarbon must be introduced into the exhaust in order to achieve an efficient reduction in NOx emissions. In order for the NOx catalyst to be properly activated and for efficient reduction of NOx levels to occur, the catalyst must also achieve a proper operating temperature.

A variety of different methods of heating an exhaust catalyst have been developed. The simplest of these involves including a separate heating element in the vicinity of the catalyst. Unfortunately, the direct heating of the catalyst in this fashion substantially increases both electrical and exhaust system complexities and costs while failing to achieve optimum activation of the catalyst. Previous secondary injection systems which inject additional fuel into the engine to create additional heating of the exhaust have failed to take into account the effects of secondary injections on fuel economy, engine durability, injector durability and fuel dilution of engine oil.

At different engine operating conditions, it may be necessary to use different injection strategies in order to achieve both desired engine operation and emissions control. As used throughout this disclosure, an "injection event" is defined as the injections that occur in a particular cylinder or combustion chamber during one cycle of the engine ("cylinder cycle"). For example, one cycle of a four stroke engine for a particular cylinder, includes an intake, compression, expansion, and exhaust stroke. Therefore, the injection event/cylinder cycle in a four stroke engine includes the number of injections, or shots, that occur in a cylinder during the four strokes of the piston. As used in the art, and throughout this disclosure, an "engine operating cycle" includes the individual cylinder cycles for the cylinders included therein. For example, an engine operating cycle for a six cylinder engine will include six individual cylinder cycles, one for each of the cylinders of the engine (with each cylinder cycle having four strokes, for a total of 24 strokes). Generally, the cylinder cycles overlap, so that the beginning of the next successive cylinder cycle of a particular cylinder might begin prior to the completion of the beginning of the next engine operating cycle. The term "shot" as used in the art may also refer to the actual fuel injection or to the command electronic fuel injection current signal (electronic fuel injection current signal), also referred to simply as a fuel injection signal, to a direct fuel injection device, fuel injector or other fuel actuation device indicative of an injection or delivery of fuel to the engine.

In the past, some prior catalyst activation systems have provided heated exhaust gasses to an exhaust catalyst using secondary fuel injections, such as the method disclosed in the U.S. Pat. No. 5,479,775 to Kraemer et al., where a secondary fuel injection is provided and the fuel is combusted to heat the exhaust gasses which are in turn supplied to an exhaust catalyst. The '775 patent does not control secondary fuel injection in order to address issues related to engine durability and fuel economy. Similarly, U.S. Pat. No. 5,839,275 to Hirota et al., describes an exhaust system catalyst and the use of an additional sub-fuel injection between a first and a third fuel injection, which increases exhaust gas temperature. However, neither the '775 patent or the '275 patent particularly address varying such a secondary (sub) injection to improve emissions, improve engine and injector durability and improve fuel economy. Nor do the '775 and '275 patents address introducing such a secondary injection gradually in order to alleviate torque/ mechanical energy produced by such an injection, which may cause problems in governing fuel and/or engine speed.

Under the more restrictive emissions regulations of today, these prior fuel partitioning strategies may yield higher than desirable hydrocarbon emissions, excess fuel consumption, excessive engine wear, reduced injector life and excessive fuel dilution of the oil. Even with more advanced electronically controlled injectors, during certain engine operating conditions, it is sometimes difficult to accurately control fuel delivery, even when utilizing electronic fuel injection current control signals.

Desired engine performance is not always achieved at all engine speeds and engine load conditions using the previously known fuel injection strategies. Based upon engine operating conditions, the injection timing, fuel flow rate and the injected fuel volume are determined in order to reduce emissions and improve fuel consumption. This is not always achieved in a split injection system or with a post injection due to a variety of reasons, including limitations on the different types of achievable electronic fuel injection signal waveforms, the amount of fuel injected during the primary shot, when the two injections take place during the particular injection event, the timing sequence between the two injections and the temperature of the exhaust catalyst. As a result, problems such as injecting fuel at a rate or time other than desired within a given injection event and/or allowing fuel to be injected beyond a desired stopping point can adversely affect emission outputs and fuel economy.

Accordingly, the present invention is directed to overcoming one or more of the problems as set forth above.

SUMMARY OF THE INVENTION

In one aspect of the present invention there is disclosed an exhaust gas heating system of a direct injection compression ignition internal combustion engine which has a plurality of combustion chambers and an exhaust passage, and one or more direct fuel injection devices, each operable to inject fuel directly into a corresponding one of the combustion chambers. The system also includes a fuel injection controller which is operable to provide to at least one of the direct fuel injection devices, a post fuel injection signal during a corresponding cylinder cycle of the corresponding one of the plurality of combustion chambers. The post fuel injection signal is timed so as to provide exhaust gas heating from a resultant post fuel injection, and the fuel injection controller dynamically determines the particular one or more of the plurality of direct fuel injection devices to which the post fuel injection signal will be applied based on a temperature related engine operating parameter.

The post fuel injection may also be timed and/or shaped such that it does not produce a substantial amount of mechanical energy but instead produces heated exhaust gasses.

These and other aspects and advantages of the present invention will become apparent upon reading the detailed description in connection with the drawings and appended claims.

BRIEF DESCRIPTION OF THE DRAWINGS

For a better understanding of the present invention, reference may be made to the accompanying drawings in which.

DETAILED DESCRIPTION

Figure 1:
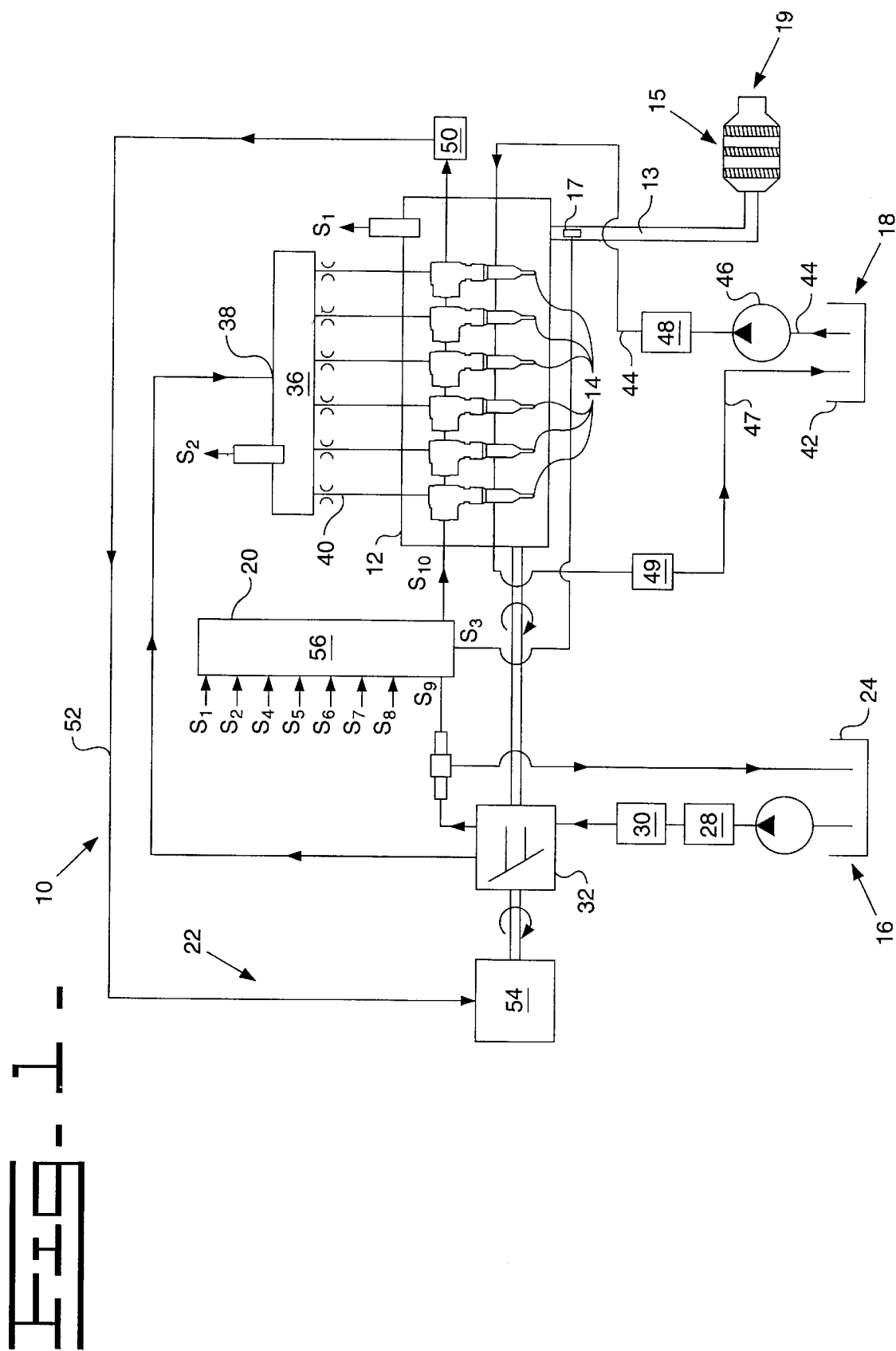
FIG. 1 is a representative schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12, preferably having a fixed compression ratio. The present invention applies to direct-injection compression ignition engines capable of running at any engine speeds, including low, medium, high, and very high engine speeds. Very high engine speeds includes engines running at 400 rpm and above. At present, the invention finds an important application in relation to lean burn diesel engines, such as Caterpillar C-9 series and 3500 series diesel engines; however, the present invention is applicable to all internal combustion engines including four-cycle and two-cycle designs.

Fuel system 10 includes one or more electronically controlled fuel injection devices, illustrated as fuel injectors 14 in this embodiment, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices, including other types of electronically controlled injectors, and mechanically actuated electronically controlled injector units as well as fluid activated common rail type fuel injection systems with digitally controlled fuel valves.

The fuel system of FIG. 1 includes an apparatus or means 16 for supplying actuation fluid to each injector 14, an apparatus or means 18 for supplying fuel to each injector, electronic control apparatus or means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply apparatus or means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector units that may be used in connection with the present invention are disclosed in U.S. Pat. Nos. 5,947,380 and 5,407,131.

Recirculating or recovering apparatus or means 22 may include a waste accumulating fluid control valve 50 for each injector 14, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering apparatus or means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of liquid.

In the illustrated embodiment, the fuel supply apparatus or means 18 includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42. In an alternative embodiment, the fuel supply apparatus or means 18 may be varied to support the needs of different fuel injection devices, such as digitally controlled fuel valves.

Electronic control apparatus or means 20 preferably includes an electronic control module (ECM) 56, also referred to as a controller, which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 or a portion thereof may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Hence, the ECM 56 or a portion thereof will also be referred to as an electronic fuel injection control device. Each of the described parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and the like that are used to determine the precise combination of injection parameters for a subsequent injection event.

For example, an engine temperature sensor 58 is illustrated in FIG. 1 connected to engine 12. In one embodiment, the engine temperature sensor includes an inlet air temperature sensor or an engine oil temperature sensor. However, an engine coolant temperature sensor or other sensors known in the art can also be used to detect the engine temperature. The engine temperature sensor 58 produces a signal designated by $S_1$ in FIG. 1 and is inputted to ECM 56. The engine temperature signal input may be referred to as a temperature related engine operating parameter. In the particular example illustrated in FIG. 1, ECM 56 issues control signal $S_9$ to control the actuation fluid pressure from pump 32 and a electronic fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is an electronic fuel injection signal that is an ECM commanded current to the injector solenoid or other electrical actuator.

Exhaust exits engine 12 via exhaust passageway 13 on its way to the exhaust treatment device or catalyst 15 and eventually exits at an outlet of the catalyst 19. Catalyst 15 preferably includes a base metal NOx catalyst, such as Zeolite, or a precious metal based catalyst, or a combination of these elements. In many applications it may also be desirable to include an oxidation catalyst, of a type known in the art, downstream of the NOx catalyst.

When the engine and/or exhaust temperatures are below a certain predetermined level, the catalyst 15 will not be activated and will not operate efficiently, increasing engine exhaust emissions. This temperature, for example, may be 40° F. A temperature sensing system which may include ECM 56, temperature sensor 58 producing signal $S_1$ to ECM 56, or exhaust gas temperature sensor 17 producing control signal $S_3$ to ECM 56, senses the various operating temperatures and reports these to the ECM 56. The exhaust gas temperature signal input may also be referred to as a temperature related engine operating parameter. When fuel injection controller or ECM 56 senses that the engine operating temperatures (temperature related engine operating parameters) are below a predetermined limit the fuel injection controller provides a post fuel injection signal to one or more of the fuel injectors 14 at a point in the engine operating cycle such that the post shot or post injection of fuel (post fuel injection) produces exhaust heating, and the exhaust treatment device is effectively activated. The post injection may occur substantially during, for example, the power stroke. Although an embodiment involves the post injection occurring substantially during the power stroke, in other embodiments the initiation of the post injection may occur during the end of the compression stroke due to the need to advance or retard the timing of the injection to maximize the system performance. This is similar to the need to slightly advance or retard the primary fuel injection. Also, testing has shown that an improvement in emissions reduction occurs when a post shot is injected later in the exhaust stroke even when no catalyst is present.

Additional hydrocarbons (HC) may also be provided to the exhaust system by way of an additional post injection of fuel through the fuel injector 14 which is mounted to the cylinder head of engine 12 and positioned to inject fuel into an engine cylinder. The additional post injection would be timed to occur at some point after the primary fuel injection to provide additional HC, in the form of engine operating fuel, to the exhaust catalyst. This is accomplished by injecting fuel into the engine cylinder at a point in the cylinder cycle when the fuel will not combust and at least some of the uncombusted fuel will be expelled into the exhaust passageway 13.

The fuel injectors 14 are designed to introduce the required amount of fuel, within an injection shape to minimize emissions, substantially during the compression stroke (primary injection) and to then inject a determined amount of fuel at a point in the cylinder cycle when the fuel will combust but will not substantially contribute to torque production. Thus additional heated exhaust gasses will be expelled into the exhaust passageway 13 to activate the catalyst 15 in expedited fashion, this being the post fuel injection. The quantity of fuel injected during the post fuel injection is dependent upon temperature related engine operating parameter such as the exhaust temperature, as determined by an exhaust gas temperature sensor 17 and input to the ECM as signal $S_3$, and the operating condition of the engine 12, as well as other parameters. In one embodiment, this is accomplished utilizing electronic control module 56 controlling the state of injector 14. In this embodiment, multiple fuel injections occur while maintaining a relatively constant injection pressure. This provides the benefit of holding the mass flow rate of the fuel injection relatively constant over multiple injections, as well as over the time period when the injector provides the post injection of fuel in the determined quantity. An additional benefit is that the injector is capable of providing the post injection of fuel in a quantity and at the selected time which are independent of the previous injections during the particular cylinder cycles.

Figure 2:
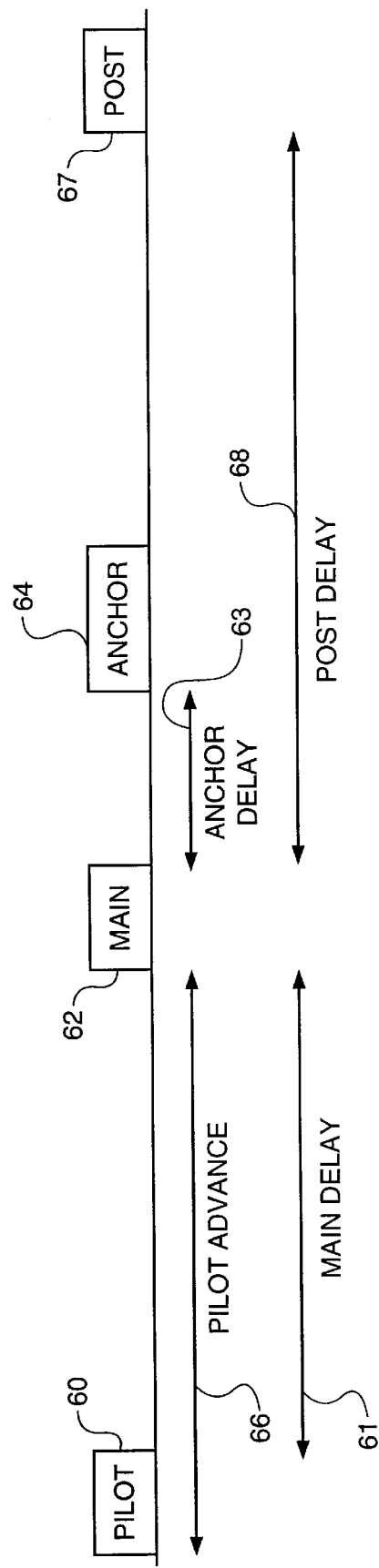
FIG. 2 is a schematic profile of a four shot fuel injection event.

It is recognized that the type of fuel injection desired during any particular fuel injection event will typically vary depending upon various engine operating conditions. In an effort to improve emissions, it has been found that delivering multiple fuel injections to a particular cylinder during a fuel injection event at certain engine operating conditions achieves both desired engine operation as well as emissions control. FIG. 2 illustrates a multiple injection event including four separate fuel injections, namely, a first fuel injection or pilot shot 60, a second fuel injection or main shot 62, a third fuel injection or anchor shot 64 and a fourth fuel injection or post shot 67. As illustrated in FIG. 2, the pilot shot 60 is injected into the combustion chamber in advance of the main shot 62 by some determined time factor, crank angle or main delay 61, and the anchor shot is sequenced after the main shot 62 based upon a predetermined time factor or crank angle resulting in an anchor delay 63. The post shot is injected subsequent to the anchor shot, and lags the main shot 62 by some predetermined time factor or crank angle resulting in a post delay 68. In addition, established timing of each shot may be determined based upon a desired piston position of each shot. Based upon programming associated with electronic controller 56 as well as a variety of different maps and/or lookup tables stored within the memory of controller 56, including maps and/or tables relating to engine speed, engine load, exhaust temperature, the pressure associated with rail passage 38 (rail pressure), desired total fuel quantity and other parameters, controller 56 will be able to dynamically determine the appropriate number of fuel shots and the quantity of fuel desired for each fuel shot 60, 62, 64 and 67, and partition the same accordingly. Moreover, it will be able to determine the timing and duration of each individual shot as well as the anchor delay 63 and post delay 68. That is, programming associated with electronic controller 56 includes parameters that are determined by computations and/or logical comparisons during program execution, with reference, for example, to the maps and/or look-up tables. Thus, any of the above-mentioned parameters with respect to FIG. 2, or combination thereof, may be selectively and/or dynamically adapted or altered over time, both with respect to individual cylinder cycles and over a single or multiple engine operating cycles. The relative positions of each fuel shot 60, 62, 64 and 67 are not proportional, and FIG. 2 merely shows in schematic form the general relationship among these shots.

The number of fuel injections may be dynamically increased or reduced during varying speed or load conditions. For example, only two injection shots may be desired at an engine load condition of ¼ of rated engine load to achieve desired exhaust emissions. In this case, the pilot shot 60 and post shot 67 will be eliminated and the main shot 62 and anchor shot 64 will be sequenced in accordance with the parameters set out herein. Under particular operating conditions, a smaller main shot and a large anchor shot split injection strategy may provide advantages in terms of exhaust emissions, including reduced particulate emissions and/or reduced NOx emissions at relatively low engine loads without going to a three shot (pilot, main and anchor shots) injection event. In fact, it has been found that if a three shot injection is utilized at certain low engine loads, an increase in hydrocarbons (HC), as compared to just a main and anchor shot, occurs due to the use of the pilot shot. As a result, a split injection method (main and anchor shot only) often times yields better emission results in this engine operating range. Similarly, below certain engine operating temperatures, the pilot shot 60 will be eliminated because the pilot shot 60 produces quantities of hydrocarbons which may plug the catalyst 15 at low temperatures. In order to activate the catalyst 15 by increasing its temperature, the ECM 56 may provide a post shot 67 as described above, in order to additionally heat the exhaust gasses. The post shot 67 may be provided independent of the previously described three-shot or two-shot events, in order to effectively activate the catalyst 15 below certain engine operating temperatures.

With respect to a four shot multiple injection event, the post shot 67 may be added or included, or alternately eliminated; and the quantity of fuel and timing associated with the post shot 67 may be adjusted according to engine operating conditions and the desired amount of NOx reduction and exhaust heating for catalyst 15 activation. Thus the post shot 67 may be dynamically added to, eliminated from, or adjusted during any multiple injection event in association with any combustion chamber during any engine operating cycle. This may preferably be accomplished by the ECM 56. For example, the post shot 67 may be included in a multiple injection event during one cylinder cycle for one combustion chamber during a first engine operating cycle, and may be eliminated from that chamber during the next engine operating cycle, or for another chamber during the same engine operating cycle. Further, a post shot 67 may be included in two, three or all multiple injection events during corresponding cylinder cycles for the respective combustion chambers during a first engine operating cycle, and may be eliminated from one, two, three, or all multiple injection events during the next engine operating cycle. The parameters of the respective post shots may also be adjusted during these events. Adjustment of these parameters may affect the shape of the post fuel injection signal provided by ECM 56. The present control system can therefore dynamically adjust the number of fuel shots, the quantity and placement of each such shot and the other associated injection parameters according to engine operating conditions.

It is recognized and anticipated that the above-described injection strategies will vary depending upon the type of engine and fuel injection devices utilized, the type of fuel used, and other parameters. All of these injection parameters are dependent upon engine operating conditions as well as other factors such as engine size and type.

The post injection strategy described herein can be used with the multiple injection strategy described above, or an injection strategy for other engines or other strategies for the same engine. For example, in one embodiment of the present invention the post injection or shot occurs between a range of approximately 20°–70° ATDC of the power stroke, and may vary according to the other shot parameters. The post shot 67 may be injected earlier in the cylinder cycle, i.e., at approximately 20° ATDC of the power stoke, in some circumstances, and may be injected later in the cylinder cycle, i.e., approximately 70° ATDC of the power stoke in other cases. Varying the timing of the post shot 67 in this way may allow more or less heated exhaust gasses (gasses at higher or lower temperatures) to be expelled from the cylinder and supplied to the exhaust treatment device 15. Adjusting the timing of and/or fuel quantity injected for the post shot 67 may also advantageously affect the combustion characteristics and engine exhaust emissions with respect to the main and anchor shots. The quantity and/or timing of the post shot 67 may be considered in apportioning fuel and/or timing of the primary shot (main shot 62 and possibly anchor shot 64). This ensures that the proper quantity of fuel is injected into the combustion chamber, and ensures that more fuel than needed is not in the combustion chamber for given engine operating conditions. Excess fuel in the combustion chamber for given engine operating conditions increases cylinder pressure leading to emissions concerns and potential structural damage as well as possible reductions in engine life/durability. Therefore the quantity of fuel to be injected and timing of the shots may be determined in response the post shot quantity and timing. Generally, quicker activation of the catalyst 15 through additional heating of the exhaust gasses results in lower engine exhaust NOx levels at certain engine operating points.

As fuel and air are mixed and compressed during the compression stroke, eventually the mixed fuel and air reach thermodynamic conditions where combustion occurs. In this regard, based upon the quantity of fuel allocated to the main shot 62, the main fuel/air mixture will typically be combusted sometime during the compression stroke. It is recognized and anticipated that combustion may occur outside of this range due to several factors including the fuel quantity associated with the main shot, the rail or injector pressure, air intake temperature and pressure, engine speed, engine load, compression ratio and other parameters. The subsequent fuel shots associated with a multiple fuel injection, such as the anchor shot 64, and/or post shot 67, typically are delivered directly into the flame front created by the combustion of the main shot 62. This can be desirable, depending upon engine operating conditions, because such fuel will ignite faster when injected into the flame front. The post injection of fuel generally occurs at a point in the cylinder cycle where the fuel will combust, so that the exhaust gasses are provided with additional thermodynamic energy (heat) and so that the additionally heated exhaust gasses are expelled into the exhaust passage 13 to heat and effectively activate the catalyst 15. This may advantageously occur where the post fuel injection is injected into a particular cylinder during the power stroke, in a manner such that a substantial quantity of mechanical energy (torque) will not be created. The torque resulting from a post shot 67 may be controlled by varying several parameters of the post fuel injection signal/post shot including the duration, frequency, shape and timing of the post shot 67, or by providing the post fuel injection signal to the fuel injectors 14 so that the resulting post shot 67 is gradually introduced to the respective combustion chambers, and/or removed therefrom.

Figure 4:
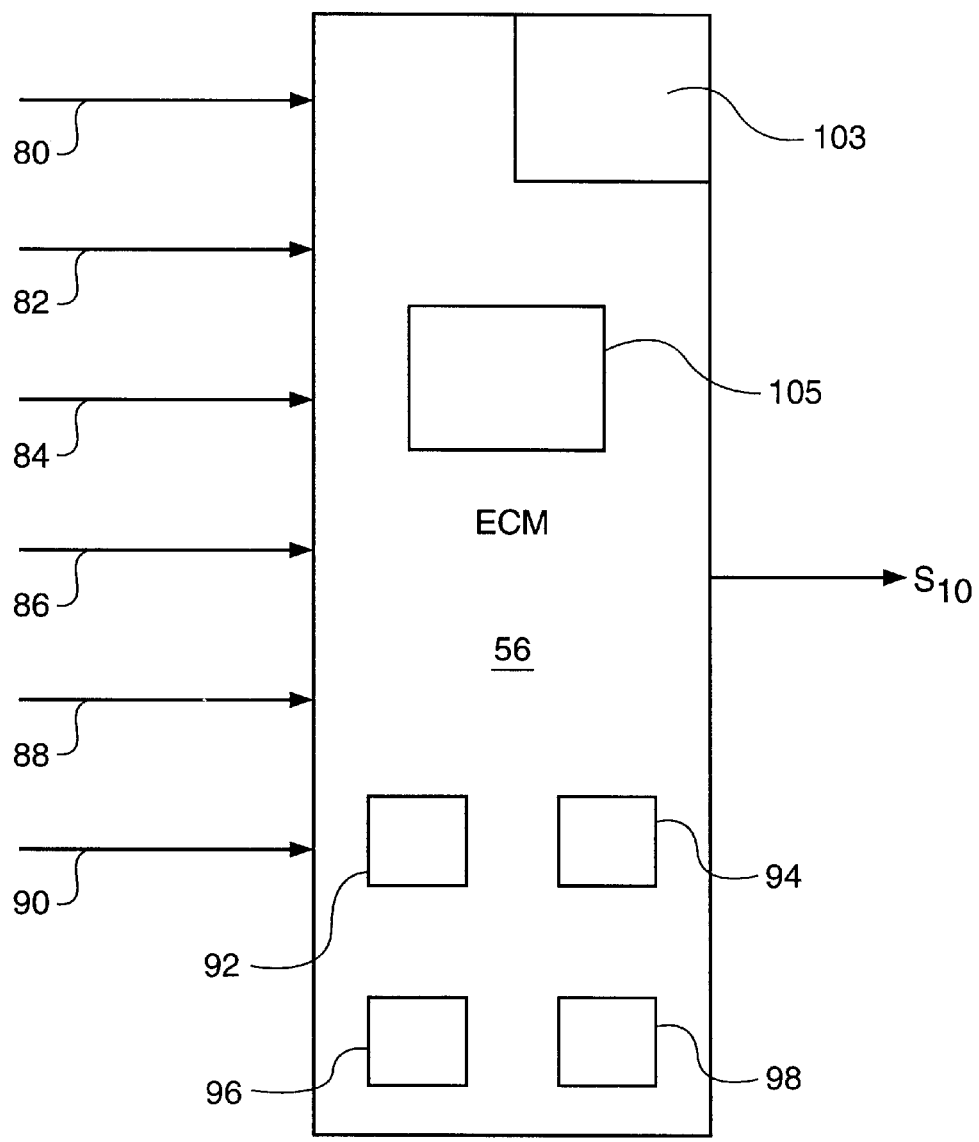
FIG. 4 is an exemplary schematic illustration of one embodiment of a control system for adjusting the parameters of a fuel injection event based upon ambient conditions.

One exemplary embodiment of the present invention includes a governor 103 (shown as a portion of the ECM 56, in FIG. 4). The governor 103 may be, for example, included as software in the programming of the ECM 56, or may be a separate hardware unit. The fuel quantity injected by the injectors 14 for use by an engine may be determined by such governor. Many different types of governors could be used for this purpose, for example, one such type of governor determines the quantity of fuel provided to the engine based on, in part, the actual speed and desired speed of the engine. In typical engine systems using this governor type, when there is a sudden change in engine speed or load there is generally a large difference between the desired and actual engine speeds, thereby causing unresponsive or uncontrolled behavior of the engine. For example, if a machine encounters a hill, and the operator moves the throttle of the engine to acquire more speed, the engine will be unresponsive. In another example, the engine may have an associated turbocharger. When the load on the engine is quickly removed, an engine overspeed or turbo surge may result. That is, when the load is removed suddenly from the engine, the engine may rapidly accelerate above the desired engine speed. The speed of the engine and the turbocharger may begin to surge uncontrollably. Similarly, the injection of a post shot 67 may cause a sudden surge in mechanical energy (torque), which may adversely affect engine operating characteristics, emissions, and durability, and may create difficult operator control conditions due to the torque "surge." Current fuel control systems may be unable to quickly and surreptitiously stabilize the engine speed, and/or torque in part, because of the sudden and significant difference between the desired and actual engine speed.

Thus, in an exemplary embodiment of the present invention, the post fuel injection signal is gradually introduced to the fuel injection devices 14 over a predefined time-period and in a manner such that the governor 103 is able to correct fuel delivery if any increase in mechanical energy occurs due to the post fuel injection 67. This may be accomplished, for example, by gradually increasing (or decreasing) the duration of the post shot over several cylinder cycles or engine cycles or over a predetermined time period, for example 0.5 seconds–2 seconds. In this and other embodiments, of the present invention, empirical data for a given engine configuration and conditions are stored in a memory location within the fuel injection control device which may preferably be included in the ECM 56. This data may be stored as a map or look-up table for interpolation by the ECM 56 (shown as a memory portion 105 of the ECM 56, in FIG. 4). From such data, a post injection fuel quantity and timing can be determined for a given system at a plurality of engine operating conditions and loads. Thus, the ECM 56 can periodically adjust the post injection fuel quantity and timing to correspond to a predetermined injection fuel amount and timing based upon engine operating conditions and engine exhaust temperature. The stored data is converted into injector pull-in and hold-in time increments corresponding to each fuel injector for each cylinder cycle by, for example, programming or algorithms of the ECM 56, which may in turn be implemented using software and/or hardware units. The fuel injector open time is determined from the data, for example, a table stored in the ECM's memory. The ECM 56 then commands the corresponding fuel injector 14 to open at the correct timing following the primary fuel injection, which may include the main and anchor fuel injections (shots), and commands the fuel injector to close when the determined quantity of fuel has been injected to the cylinder. These commands are accomplished using the current wave-forms described in detail below. In some applications it may also be desirable to convert the stored data in memory 105 of ECM 56 into curve fit equations that are utilized by the ECM 56 as an alternative to a "look-up" table, as previously described. In such a case, the injector pull-in and hold-in time would be calculated via the curve and fit function by the ECM 56, and utilizing the engine operating conditions sensed by the ECM 56.

Figure 3:
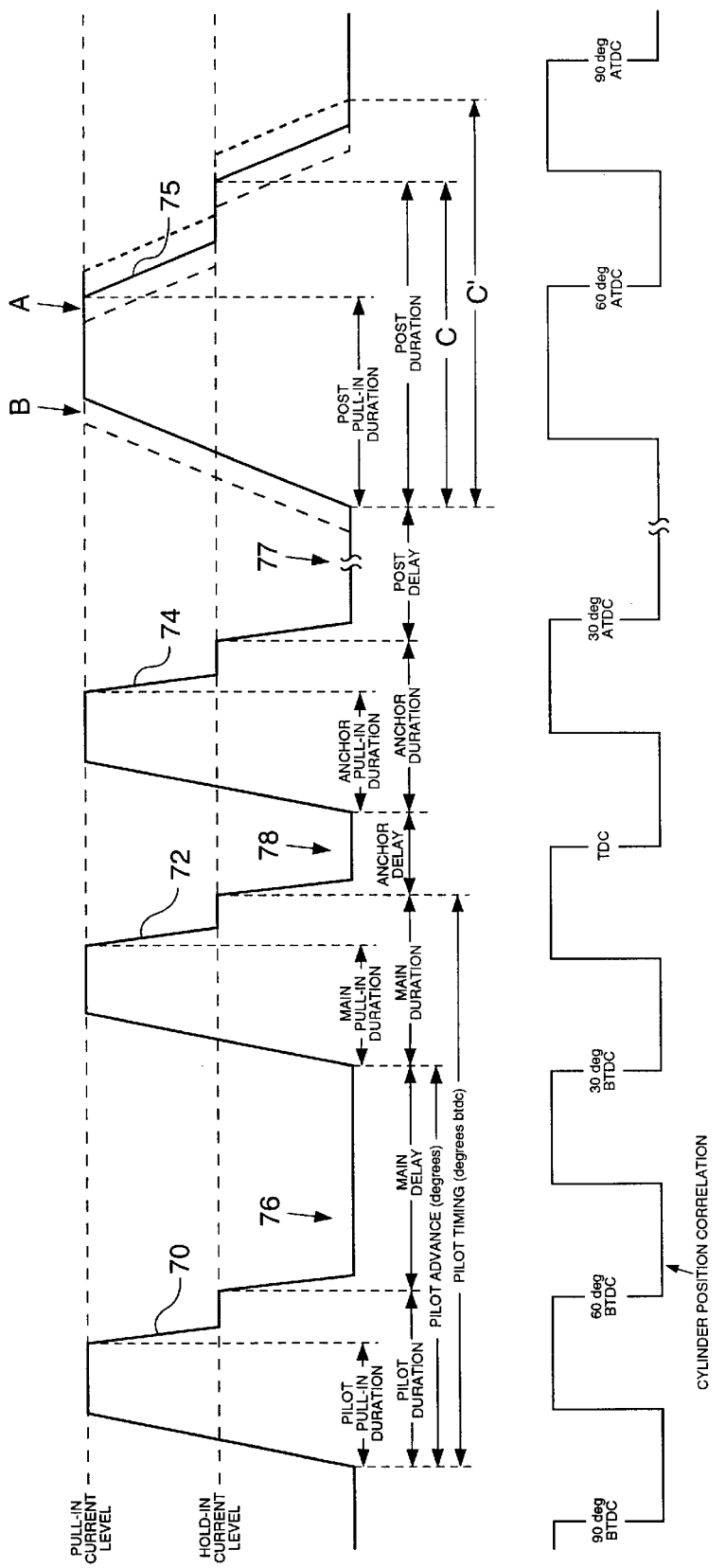
FIG. 3 is a schematic diagram of an exemplary current waveform for a four shot injection event.

An exemplary electronic fuel injection current signal waveform for a four shot injection event is illustrated in FIG. 3 showing a first or pilot shot (electronic) fuel injection signal (control signal) 70, a second or main shot (electronic) fuel injection signal (control signal) 72, a third or anchor shot (electronic) fuel injection signal (control signal) 74, a post shot (electronic) fuel injection signal (control signal) 75, a main delay signal 76 between the pilot and main shots, an anchor delay signal 78 between the main and anchor shots, and a post delay signal 77 between the anchor and post shots. The duration of each of the control signals 70, 72, 74 and 75 can be varied by ECM 56, and the duration of delays 76, 77 and 78 can likewise be controlled by ECM 56. In one embodiment, the timing and duration of the main shot 62 is determined and set by ECM 56 and the timing and duration of the pilot shot 60 and anchor shot 64 are thereafter determined based upon the main shot timing. The post shot 67 timing may then be determined either dependently on these values, or independently thereof. In this regard, the start of the pilot shot 60 will typically be determined based upon known parameters such as the main shot timing and pilot advance and the anchor shot timing will be just a time delay based upon termination of the main shot. As set out above and described in detail below, the timing and duration of any of the signals 70, 72, 74 and 75, and particularly post fuel injection signal 75. can be varied by ECM 56. As shown in FIG. 3, the timing A and B of post fuel injection signal 75 can be varied within a cylinder cycle. The alternate timing B of post fuel injection signal 75 is shown by the dashed outline. Also, the duration C may be varied. The alternate duration C' of post fuel injection signal 75 is again shown by the dashed outline. Other methods for determining the various parameters associated with the four fuel injection shots may be applied without undue experimentation.

FIG. 3 also illustrates the pull-in and hold-in current levels associated with a typical hydraulically actuated electronically controlled fuel injector. When using hydraulically actuated electronically controlled fuel injectors, the electronic fuel injection signal generally includes a two-tier form that has a pull-in current level and a generally lower hold-in current level. The higher pull-in current is used to quickly open the fuel injector and thereby decrease the response time, that is, the time between the initiation of an electronic fuel injection signal and the time in which fuel actually begins to enter the engine cylinder. Once fuel injection has commenced, a lower level hold-in current can be used to hold the injector open for the remainder of the injection event. The pilot, main, anchor and post pull-in durations are likewise illustrated in the representative current waveform depicted in FIG. 3. Based upon engine operating conditions, the type of fuel and fuel injectors being utilized, and other parameters, it is recognized and anticipated that the waveform illustrated in FIG. 3 may be modified and altered accordingly.

It is further recognized that other mechanisms such as latching valves may be utilized with certain types of fuel injectors wherein different waveforms from that depicted in FIG. 3 will be required and wherein no hold-in current will be necessary.

It is also anticipated, in one embodiment, that the pull-in duration for each shot, the shot duration, the anchor delay, the post delay and the pilot and main shot timing with respect to the displacement of the cylinder piston will be determined, calculated, or looked up in respective maps and/or tables as a function of any one or more of the following parameters, namely, engine speed, engine load, rail pressure, total desired fuel quantity, oil or coolant temperature, exhaust temperature, atmospheric pressure and still other parameters. It is also recognized that other fuel systems will use different current waveforms. A significant feature of FIG. 3 is the relationship of current waveform to the piston location and injection profile.

Still further, it should be noted that although in one embodiment of the present invention disclosed herein, each separate fuel shot associated with a multiple fuel injection event is delivered or injected into the combustion chamber when the cylinder piston is located or displaced within a predetermined range during the compression, and power strokes, it is recognized that each such separate fuel shot can be delivered outside of these ranges due to factors such as the fuel quantity associated with each fuel shot, the injection pressure, engine speed, engine load and other parameters. In this regard, it is recognized that the pilot shot can be injected at any time during the compression stroke; the main shot can be injected at any time during the compression or power stroke after delivery of the pilot shot; the anchor shot can be injected at any time during the compression or power stroke after delivery of the main shot; and the post shot can be injected any time during the power or exhaust stroke after delivery of the anchor shot. However, the post shot is delivered at a point in the cylinder cycle such that the shot combusts, thereby producing additionally heated exhaust gasses to the exhaust treatment device 15. In addition, although the present multiple fuel injection events have been discussed in terms of an exemplary fuel injection (current) signal waveform such as the exemplary waveform illustrated in FIG. 3 wherein a separate fuel injection (current) signal or pulse actuates each fuel shot, it is also recognized that other types of control signals, for example hydraulic pressure, could be used in connection with other types of direct fuel injection device (fuel injectors) and fuel injection schemes. For example, some fuel injectors use hydraulic pressure to control injection timing and in those systems, a separate pressurization of the actuating fluid may take place for the injection of each fuel shot.

In one exemplary embodiment of the present invention, the fuel injection system determines how much exhaust gas heating is required and then calculates or otherwise determines the amount of fuel apportioned for exhaust gas heating, and the injectors to which the fuel will be apportioned (number of cylinders in which to inject the post shot 67). This is determined by varying (ON/OFF) the respective duration (duration $\geq 0$ is ON) of each post fuel injection signal for each fuel injection device 14 during each cylinder cycle. There is a trade-off between brake specific fuel consumption, simply referred to as fuel consumption, and improved emissions resulting from this strategy. That is, using the strategy results in improved emissions, due to the quick activation of the catalyst 15, at the cost of increased fuel consumption or a brake specific fuel consumption penalty. Therefore, the system 10 may determine the minimum quantity of fuel to be injected via post shots to achieve the desired exhaust gas heating and also the appropriate number of cylinders into which to inject the post shot 67. For example, in one embodiment, only one cylinder receives the post shot during the cylinder cycle. During the next cylinder cycle the cylinder receiving the shot may be rotated, so that each cylinder will eventually receive the post shot 67. In another embodiment two cylinders may receive the post shot 67 during each respective cylinder cycle, and each cylinder receiving the post shot 67 may be rotated during the successive cylinder cycle. By varying the cylinders in which post shots are injected, the fuel system 10 can vary the quantity of fuel injected during the post shot 67 and the time during the engine cycle when the fuel injected during the post shot 67 will be combusted so as to mitigate any torque produced thereby. Also, by rotating the post shot among the engine cylinders during successive cylinder cycles an embodiment of the present invention can better achieve more even wear among the engine's fuel injectors.

A look up table or other method may be used for calculating the number of post injections, i.e., the number of cylinders that will utilize a post shot during one cycle to achieve the desired amount of exhaust gas heating for a particular engine operating condition versus brake specific fuel consumption. The post shot is desirably injected between 20°–70° after top dead center ("ATDC") in the power stroke. The injection timing, as described above, is variable and may be dynamically determined.

As set out above, timing of the post shot is determined with respect to the amount of exhaust gas heating desired, and it may be determined independent of the first, second and third fuel injection shots. Alternately, the post shot timing may be determined dependent upon the first, second, and third fuel injections. In secondary fuel injection systems know in the art, the number of the secondary injections or post shots is selected as a trade-off between optimal conversion efficiency of the catalyst, versus fuel consumption and injector life. Injector life is generally proportional to the number of injections made by the injector. While any increase in the overall number of discrete injections may impact the durability of an injector, this may be mitigated by the rotation of the post shot among injectors. Thus, allowing for reduced emissions while maintaining an acceptable injector life. Because fuel economy is highly desired, and because current fuel injectors are required to have a long cycle life (durability), the present invention has the added advantage of tailoring catalyst activation and conversion efficiency with respect to fuel economy and injector life. Further, the post injection may be selectively provided to any number of fuel injectors during an engine cycle. The ECM 56 can deliver a post fuel injection signal to any one, two or all of the injectors 14 resulting in a post injection of fuel from each corresponding injector and thereby greatly minimizing any effect on fuel injector life or cylinder durability while greatly increasing the rate at which the catalyst 15 is activated. Additionally, an embodiment of the present invention also has the advantage of injecting fuel into one or more cylinders where the temperature and pressure are higher than possible in the exhaust passage, allowing for better decomposition of the fuel into intermediate hydrocarbons which may in turn increase catalyst efficiency. The use of the post fuel injection to additionally heat the exhaust gasses and thereby activate the catalyst 15 also greatly simplifies conventional electrical and exhaust systems where the catalyst is directly heated by, for example, a heating element.

In one embodiment, the post fuel injection 67 is selectively provided to a different fuel injector 14 during each of several successive engine operating cycles. Thus, if a single post fuel injection is selected, the post fuel injection 67 is successively provided to each cylinder of the engine, i.e., cylinders 1 through 6 in FIG. 1, before being repeated in the initial cylinder, i.e. cylinder 1 of FIG. 1. Alternately, in another embodiment, if ECM 56 determines that a post shot 67 is required in two cylinders per engine cycle to achieve a desired NOx reduction, then the ECM 56 may cause the post injection 67 to be provided to two or more cylinders during one engine operating cycle. An embodiment of present invention is also capable of, for example, selectively providing the post fuel injection 67 to individual cylinders (combustion chambers) of the engine; i.e., if a single post fuel injection 67 is selected for an engine operating cycle, the post fuel injection 67 is provided to cylinder 1, then cylinder 3, while skipping cylinder 2 of FIG. 1, before being repeated in the initial cylinder, i.e. cylinder 1 of FIG. 1. While providing the post injection 67 to two, three or all cylinders increases the amount of exhaust gas heating, there may be a corresponding penalty in brake specific fuel consumption. Thus, if greater fuel efficiency is required less post shots may be provided, while if greater exhaust gas heating is desired a corresponding greater penalty in brake specific fuel consumption may be tolerated.

Industrial Applicability

Utilization of an injection method and system in accordance with the present invention provides for better emission control during varying engine operating conditions as explained above. Although the particular injection waveform for delivering multiple fuel injections may vary depending upon the particular engine operating conditions, the present system is capable of dynamically determining the number of shots to be injected, the timing associated with each individual injection event, the injection duration, any delays between injections, and the displacement of the cylinder piston relative to the beginning of each injection. This determination can be made regardless of the type of electronically controlled fuel injectors or digitally controlled valves or common rail fuel system being utilized, regardless of the type of engine being utilized, and regardless of the type of fuel being utilized. In this regard, appropriate fuel maps relating rail pressure, engine speed, engine load, exhaust temperature, pilot/main/anchor/post duration times, pilot/main/anchor/post fuel quantities, anchor timing delays, post timing delays, pilot and main shot timing, and other parameters can be stored or otherwise programmed into ECM 56 for use during all operating conditions of the engine. These operational maps, tables and/or mathematical equations stored in the ECM programmable memory determine and control the various parameters associated with the appropriate multiple injection events to achieve desired emissions control.

It is also recognized that the particular ambient conditions under which the engine will be operating will affect the amount of emissions produced by the engine. As the ambient conditions change, so will the engine exhaust emissions. As a result, the multiple fuel injection events may have to be adjusted in order to keep the engine emissions within required limits based upon ambient conditions. These adjustments may include adjustments to the pilot injection timing and quantity, the main injection timing and quantity, the delay between the pilot and main injections, and the delay between the main and anchor injections. The timing delay and fuel quantity of the post injection may also be varied depending on NOx reduction requirements, or with respect to the pilot, main and anchor shots. Ambient conditions can be monitored by providing and coupling appropriate sensors to ECM 56, as will be hereinafter explained.

FIG. 4 is an exemplary schematic diagram showing representative sensor inputs to ECM 56 in order to monitor the ambient conditions under which the engine is operating. For example, appropriate sensors can be positioned and located with respect to a particular engine so as to input appropriate signals 80 and 82 to ECM 56, representative of the ambient temperature and/or pressure, respectively, under which the engine is currently operating. Based upon the ambient temperature and/or pressure, ECM 56 can select the appropriate maps or lookup tables for that particular ambient condition and thereafter either determine the appropriate parameters for each injection event based upon the existing ambient temperature and/or pressure. Alternatively, ECM 56 could determine a correction or adjustment factor to be applied to the injection event parameters calculated based upon some normal or nominal operating conditions, such as a standard day temperature and pressure. In this regard, the appropriate maps and lookup tables could include a set of such maps and/or lookup tables based upon certain predetermined ambient temperature and/or pressure ranges, a different set of maps and/or tables being applicable to each predetermined range. On the other hand, ECM 56 could likewise include a set of maps and/or lookup tables based upon ambient temperatures and/or pressures which will enable ECM 56 to determine a correction or adjustment factor which can be applied to the various parameters of each injection event, the correction or adjustment factor being scaled with reference to some normal or nominal operating engine conditions. High altitude or cold start conditions are examples of ambient conditions which may affect emissions and may require the ECM 56 to adjust the parameters of the multiple fuel injection events.

As indicated in FIG. 4, based upon a sensor input of ambient temperature 80 and/or ambient pressure 82, ECM 56 would generate and output appropriate signals $S_{10}$ to the fuel injection devices 14 to adjust the desired pilot shot timing and/or fuel quantity (adjustment 92), to adjust the main fuel shot timing and/or fuel quantity (adjustment 94), to adjust the desired delay between the pilot and main fuel shots (adjustment 96), and/or to adjust the desired delay between the main and anchor fuel shots (adjustment 98). Any one or more of these adjustments 92, 94, 96 and 98 may be accomplished by the ECM to achieve the desired pilot, main and anchor fuel shots in order to control exhaust emissions and keep such emissions within certain predetermined limits. This may be accomplished, for example, by programming or algorithms of the ECM 56, which may in turn be implemented using software and/or hardware units, in conjunction with memory 105 of the ECM 56 and a governor 103 of the ECM 56. The ECM 56 could also then adjust the post shot accordingly with regard to adjustments made to the pilot, main, and/or anchor shots, and/or with respect to the engine and/or the exhaust temperatures and resultant need to activate the catalyst 15. In addition, in one embodiment, instead of adjusting the timing or quantity of the shots after an initial distribution determination, one set of fuel distribution maps may be utilized, accounting for all the relevant factors, such as speed, load, and ambient conditions.

It is also recognized and anticipated that other parameters or engine operating conditions can likewise be sensed and inputted to ECM 56, other than ambient temperature 80 and/or ambient pressure 82, in order to determine the ambient operating conditions of the engine. For example, ECM 56 could be coupled to a sensor to receive a signal 84 indicative of the inlet manifold temperature associated with the engine, to a sensor to receive a signal 86 indicative of the inlet manifold pressure, to a sensor to receive a signal 88 indicative of the humidity, and/or to a sensor to receive a signal 90 indicative of the crankcase oil pressure. These engine parameters could likewise be correlated or translated through various maps, tables and/or equations to establish the ambient operating conditions of the engine and, based upon any one or a plurality of such signals 80, 82, 84, 86, 88 and 90, ECM 56 could make any one or more of the adjustments 92, 94, 96 and/or 98 and output appropriate signals $S_{10}$ to adjust the parameters of the multiple injection events, including events incorporating a post fuel injection. All of the sensors providing signals 80, 82, 84, 86, 88 and/or 90 would preferably continuously monitor its corresponding parameter associated with the operation of the engine and each such sensor would output an appropriate signal to ECM 56 indicative of such sensed parameters. Still further, it is recognized and anticipated that other parameters and sensors, other than those identified in FIG. 4, such as a coolant temperature sensor, an engine oil temperature sensor, a mass air flow sensor, and/or an exhaust gas temperature sensor, could likewise be used to determine the ambient operating conditions of the engine.

The post fuel injections are also dynamically determined by the ECM 56, and the appropriate fuel injection signal(s), $S_{10}$, are output to the injectors 14. In one embodiment of the present invention, temperature parameters in particular may be sensed and inputted to the ECM 56 for determination of whether to inject the post shot. These parameters include the engine temperature sensed by the temperature sensor 58 producing signal $S_1$ to ECM 56, and/or the engine exhaust gas temperature sensed by the exhaust gas temperature sensor 17 and input to the ECM 56 as input $S_3$ (FIG. 1). If the temperatures is low enough, i.e., the engine operating temperature is equal to or less than 40° F., then the post shot 67 will be provided to activate the catalyst 15. If the temperature is too high, i.e. greater than 45° F., then a post shot will not be delivered. Additional parameters including the desired quantity of NOx reduction for a particular set of conditions are used by the ECM 56 to determine if, and how many post shots are delivered respective cylinders during an engine cycle.

The activation of the exhaust treatment device (catalyst 15) by actuating the fuel injector 14 to inject a post shot 67, combust a post shot 67, expel the resultant heated gasses from the combustion chamber to the exhaust passage 17, and flow the exhaust gasses into and heat the exhaust treatment device 15, markedly increases the efficiency of the catalyst to remove undesirable contaminates from the exhaust gases such as NOx. This versatility, efficiency and simplicity with which a post injection based activation of the exhaust treatment device 15 may be accomplished. Use of the post shot 67 to implement activation of the exhaust treatment device 15 results in the elimination of separate activation equipment which are found in previous activation systems. Further the flexibility of the present invention allows for greater tailoring of the activation, conversion efficiency and NOx reduction with respect to fuel consumption and engine durability. This greatly improves/reduces system complexity while increasing reliability.

Figure 5:
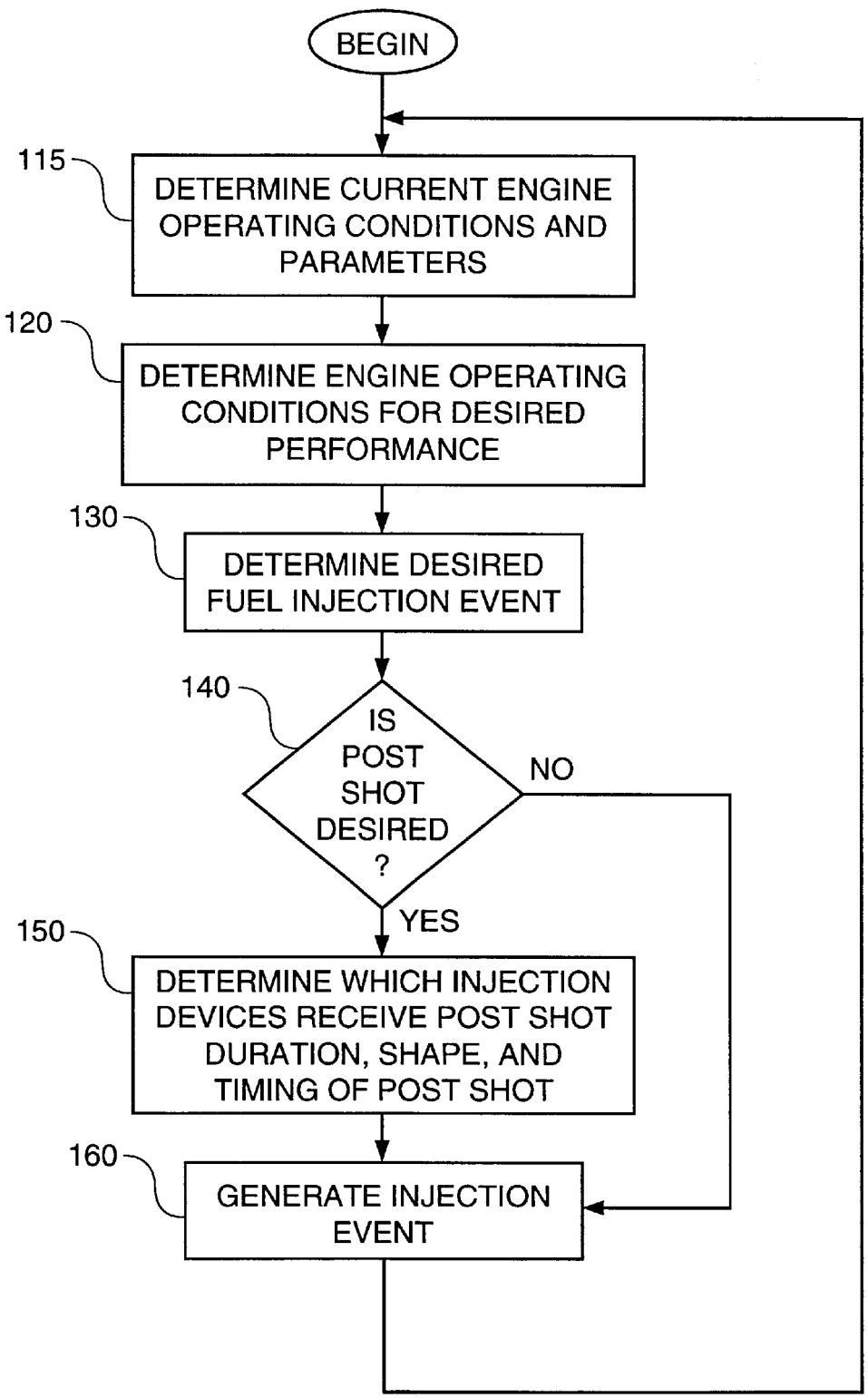
FIG. 5 is an exemplary graphical illustration of a process for operation of a controller embodying principles of the present invention.

FIG. 5 is an exemplary graphical representation of a process by which the exhaust gas heating system of the present invention and particularly the ECM 56 selects and uses predetermined ones of a plurality of parameters associated with a particular multiple fuel injection event in order to dynamically control the application of one or more post shot injections during an engine operating cycle. Current operation parameters are determined in block 115. on the basis of sensor outputs and calculations, as appropriate. Then, in block 120, ECM 56 determines the appropriate engine operating conditions for a desired engine performance. Those conditions may be based upon calculated or predetermined engine performance standards, including temperature related engine operating parameters, NOx emissions and engine efficiency. In block 130, a desired fuel injection event is determined, which may be the next engine operating cycle, the next cylinder cycle, or any one or more of the subsequent engine operating cycles or cylinder cycles. Other fuel injection events may be used, as would be known to one skilled in the art. A decision is then made dynamically in block 140, on the basis of the determinations in blocks 115, 120 and 130, as to whether a post shot is desired in the identified fuel injection event. If one is not desired, the process proceeds to the generation of all of the signals for the injection event. If a post shot is desired, then several determinations are made in block 150 as to which of the injector(s) are to receive a post shot, and the duration and timing of the post shot. Finally, the signals for the injection event, including post shot signal if desired, is generated in block 160.

Clearly, a determination as to whether to provide a post shot 67 during a particular cylinder cycle for a particular cylinder is based on engine operating parameters including temperature related engine operating parameters, as well as the relevant history of providing post shots during previous cylinder cycles in that particular cylinder and in other cylinders within the engine 12, as set out above.

It is therefore desirable to control and deliver any number of separate fuel injections to a particular cylinder including three or more fuel shots, and particularly a post fuel shot, so as to reduce emissions and improve fuel consumption while improving NOx emissions based upon the operating conditions of the engine at that particular point in time. This may include splitting the fuel injection into more than two separate fuel shots during a particular injection event, providing a specific fuel quantity relationship between the respective fuel shots in a particular injection event based upon the number of fuel shots associated therewith, advancing the pilot and or main shots during the compression stroke, delivering the respective fuel shots within defined crank angle or cylinder piston displacement limits, and adjusting the timing between the various multiple fuel injections in order to achieve desired emissions and fuel consumption. In some situations, it is also desirable to rate shape the front end of the fuel delivery to the cylinder to control the burn characteristics of the particular fuel being utilized and, in other situations, it may be desirable to rate shape the tail end of the fuel delivery to the cylinder to achieve desired emissions control and engine performance.

Although fuel system 10 illustrated in FIG. 1 has been shown as a representative six injector system, it is recognized that the present invention could be incorporated into fuel injection systems including any number of fuel injectors as well as both hydraulically actuated and mechanically actuated electronically controlled fuel injector units as well as into a fluid activated common rail fuel system. Where mechanically actuated electronically controlled fuel injectors are used, the rail or manifold 36 in FIG. 1 will typically be replaced with a mechanical actuating mechanism for causing each injector to pressurize fuel, such as the mechanisms illustrated in U.S. Pat. Nos. 5,947,380 and 5,407,131. Other mechanisms for accomplishing this task are likewise known and available.

As is evident from the forgoing description, certain aspects of the present invention are not limited by the particular details of the examples illustrated herein and it is therefore contemplated that other modifications and applications, or equivalence thereof, will occur to those skilled in the art. It is accordingly intended that the claims shall cover all such modifications and applications that do not depart from the spirit and scope of the present invention.

Other aspects, and advantages of the present invention can be obtained from a study of the drawings, the disclosure and the appended claims.

What is claimed is:

1. A method of controlling the injection of fuel into combustion chambers of a direct injection compression ignition internal combustion engine comprising the steps of:
    determining whether activation of an exhaust treatment device is required based on at least one temperature related engine operating parameter, and if required,
    providing to at least one direct fuel injection device a fuel injection signal including a post fuel injection signal for producing a post fuel injection during a cylinder cycle of a corresponding one of the plurality of combustion chambers, whereby combustion of fuel injected in response to the fuel injection signal provides a predetermined quantity of heated exhaust gas for increasing exhaust treatment device efficiency; and
    dynamically determining at least one parameter of the post fuel injection signal provided to the at least one direct fuel injection device based on the at least one temperature related engine operating parameter, such that the post fuel injection does not produce substantial mechanical energy.

2. The method of claim 1, wherein the at least one parameter of the post fuel injection signal includes at least one of a duration, timing and shape of the post fuel injection signal.

3. The method of claim 1, further including determining the particular one or more of the plurality of direct fuel injection devices to which a post fuel injection signal is applied during one engine operating cycle, and the duration of each such post fuel injection signal.

4. The method of claim 3, further including varying the ones of direct fuel injection devices to which the post fuel injection signal is applied during one engine operating cycle in order to dynamically vary the amount of exhaust gas heating provided during one engine operating cycle using the post fuel injection signals.

5. The method of claim 3, further including determining the duration and the timing of the post fuel injection signals such that the resulting post fuel injections are gradually introduced by increasing the durations of the corresponding fuel injection signals over a plurality of cylinder cycles, whereby the resulting post fuel injections do not produce substantial mechanical energy.

6. The method of claim 3, further including determining the duration and the timing of the post fuel injection signals such that the resulting post fuel injections are gradually removed by decreasing the durations of the corresponding fuel injection signals over a plurality of cylinder cycles, such that the resulting post fuel injections do not substantially reduce the produced mechanical energy.

7. The method of claim 1, further including:
    providing to a plurality of direct fuel injection devices a fuel injection signal including a post fuel injection signal;
    determining the duration and the timing of the post fuel injection signals such that the resulting post fuel injections are gradually introduced by increasing the durations of the corresponding fuel injection signals over a plurality of engine operating cycles, and operating a governor of the direct injection compression ignition internal combustion engine to correct fuel delivery if any increase in mechanical energy occurs due to the post fuel injection; and then
    determining the duration and the timing of the post fuel injection signals such that the resulting post fuel injections are gradually removed by decreasing the durations of the corresponding fuel injection signals over a plurality of engine operating cycles, and operating the governor to correct fuel delivery if any decrease in mechanical energy occurs due to the post fuel injection.

8. An exhaust gas heating system of a direct injection compression ignition internal combustion engine having a plurality of combustion chambers and an exhaust passage, comprising:

means for determining whether activation of the exhaust treatment device is required based on at least one temperature related engine operating parameter, and if required, means for providing to at least one direct fuel injection device a fuel injection signal including a post fuel injection signal for producing a post fuel injection during a cylinder cycle of a corresponding one of the plurality of combustion chambers, whereby combustion of fuel injected in response to the fuel injection signal provides a predetermined quantity of heated exhaust gas for increasing exhaust treatment device efficiency; and means for dynamically determining at least one parameter of the post fuel injection signal provided to the at least one direct fuel injection device based on the at least one temperature related engine operating parameter, such that the post fuel injection does not produce substantial mechanical energy.

9. The exhaust gas heating system of claim 8, wherein the at least one parameter of the post fuel injection signal includes at least one of a duration, timing and shape of the post fuel injection signal.

10. The exhaust gas heating system of claim 9, further including means for determining the particular one or more of the plurality of direct fuel injection devices to which a post fuel injection signal is applied during one engine operating cycle, and the duration of each such post fuel injection signal, each such post fuel injection signal having a duration which is greater than zero.

11. The exhaust gas heating system of claim 10, further including means for varying the ones of direct fuel injection devices to which the post fuel injection signal is applied during one engine operating cycle in order to dynamically vary the amount of exhaust gas heating provided during one engine operating cycle using the post fuel injection signals.

12. The exhaust gas heating system of claim 9, further including:

means for providing to a plurality of direct fuel injection devices a fuel injection signal including a post fuel injection signal;

means for determining the duration and the timing of the post fuel injection signals such that the resulting post fuel injections are gradually introduced by increasing the durations of the corresponding fuel injection signals over a plurality of cylinder cycles, whereby the resulting post fuel injections do not produce substantial mechanical energy; and means for determining the duration and the timing of the post fuel injection signals such that the resulting post fuel injections are gradually removed by decreasing the durations of the corresponding fuel injection signals over a plurality of cylinder cycles, whereby the resulting post fuel injections do not substantially reduce the produced mechanical energy.

13. A computer program product including a computer readable medium containing instructions for, controlling a fuel injection control system of a direct injection compression ignition internal combustion engine having a plurality of combustion chambers and an exhaust passage and a governor, for use with an exhaust gas heating system, the instructions comprising the steps of:

determining whether activation of an exhaust treatment device is required based on at least one temperature related engine operating parameter, and if required, providing to at least one direct fuel injection device a fuel injection signal including a post fuel injection signal for producing a post fuel injection during a cylinder cycle of a corresponding one of the plurality of combustion chambers, whereby combustion of fuel injected in response to the fuel injection signal provides a predetermined quantity of heated exhaust gas for increasing exhaust treatment device efficiency; and dynamically determining at least one parameter of the post fuel injection signal provided to the at least one direct fuel injection device based on the at least one temperature related engine operating parameter, such that the post fuel injection does not produce substantial mechanical energy.

14. The computer program product of claim 13, wherein the at least one parameter of the post fuel injection signal includes at least one of a duration, timing and shape of the post fuel injection signal.

15. The computer program product of claim 14, the instructions further including determining the particular one or more of the plurality of direct fuel injection devices to which a post fuel injection signal is applied during one engine operating cycle, and the duration of each such post fuel injection signal.

16. The computer program product of claim 15, the instructions further including varying the ones of direct fuel injection devices to which the post fuel injection signal is applied during one engine operating cycle in order to dynamically vary the amount of exhaust gas heating provided during one engine operating cycle using the post fuel injection signals.

17. The computer program product of claim 14, the instructions further comprising the steps of:

providing to a plurality of direct fuel injection devices a fuel injection signal including a post fuel injection signal;

determining the duration and the timing of the post fuel injection signals such that the resulting post fuel injections are gradually introduced by increasing the durations of the corresponding fuel injection signals over a plurality of cylinder cycles, whereby the resulting post fuel injections do not produce substantial mechanical energy; and determining the duration and the timing of the post fuel injection signals such that the resulting post fuel injections are gradually removed by decreasing the durations of the corresponding fuel injection signals over a plurality of cylinder cycles, whereby the resulting post fuel injections do not substantially reduce the produced mechanical energy.

* * * * *